(12) United States Patent
Ortega et al.

(10) Patent No.: US 7,073,845 B2
(45) Date of Patent: Jul. 11, 2006

(54) AERODYNAMIC DRAG REDUCTION APPARATUS FOR GAP-DIVIDED BLUFF BODIES SUCH AS TRACTOR-TRAILERS

(75) Inventors: Jason M. Ortega, Pacifica, CA (US); Kambiz Salari, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/786,398

(22) Filed: Feb. 24, 2004

(65) Prior Publication Data

US 2004/0239146 A1 Dec. 2, 2004

Related U.S. Application Data

(60) Provisional application No. 60/474,980, filed on May 30, 2003.

(51) Int. Cl.
 *B62D 35/00* (2006.01)
(52) U.S. Cl. .............................. 296/180.3; 296/180.4; 296/180.2
(58) Field of Classification Search .. 296/180.1–180.5, 296/91; 105/1.3, 15, 18; 180/903
See application file for complete search history.

(56) References Cited

U.S. PATENT DOCUMENTS

| 619,785 | A | * | 2/1899 | Perry et al. ................... 105/18 |
| 1,104,938 | A | * | 7/1914 | Schreiber ..................... 105/16 |
| 3,971,586 | A |  | 7/1976 | Saunders |
| 4,021,069 | A |  | 5/1977 | Hersh |
| 4,257,640 | A | * | 3/1981 | Wiley ...................... 296/180.3 |
| 5,078,448 | A | * | 1/1992 | Selzer et al. ............. 296/180.2 |

\* cited by examiner

*Primary Examiner*—Stephen Gordon
(74) *Attorney, Agent, or Firm*—James Tak; Alan H. Thompson; Michael STaggs

(57) ABSTRACT

An apparatus for reducing the aerodynamic drag of a bluff-bodied vehicle such as a tractor-trailer in a flowstream, the bluff-bodied vehicle of a type having a leading portion, a trailing portion connected to the leading portion, and a gap between the leading and trailing portions defining a recirculation zone. The apparatus is preferably a baffle assembly, such as a vertical panel, adapted to span a width of the gap between the leading and trailing portions so as to impede cross-flow through the gap, with the span of the baffle assembly automatically adjusting for variations in the gap width when the leading and trailing portions pivot relative to each other.

7 Claims, 9 Drawing Sheets

AERODYNAMIC DRAG REDUCTION APPARATUS FOR GAP-DIVIDED BLUFF BODIES SUCH AS TRACTOR-TRAILERS

I. CLAIM OF PRIORITY IN PROVISIONAL APPLICATION

This application claims priority in provisional application filed on May 30, 2003, entitled "Drag Reduction of a Heavy Vehicle by Stabilizing the Gap Flow between the Tractor and Trailer through the Use of a Vertical Plate" Ser. No. 60/474980, by Jason M. Ortega et al, and incorporated herein by reference.

The United States Government has rights in this invention pursuant to Contract No. W-7405-ENG48 between the United States Department of Energy and the University of California for the operation of Lawrence Livermore National Laboratory.

II. FIELD OF THE INVENTION

The present invention relates to aerodynamic drag reduction methods and devices. The invention relates more particularly to an apparatus for reducing the aerodynamic drag of a bluff bodied vehicle caused by a gap between leading and trailing portions of the bluff bodied vehicle, by baffling and thus impeding cross-flow through the gap.

III. BACKGROUND OF THE INVENTION

It is well known in the art of vehicle design that the fuel consumption of a vehicle associated with its movement is directly related to certain aerodynamic characteristics of the vehicle, such as the aerodynamic drag of the vehicle expressed as the drag coefficient, Cd. As the aerodynamic drag experienced by a vehicle increases, the fuel costs also correspondingly increase due to the greater energy required to overcome the drag. For example, for a vehicle traveling 70 mph on a roadway, approximately 65% of the total fuel consumption of its engine is used to overcome aerodynamic drag. Thus, even a slight reduction in the aerodynamic drag coefficient of the vehicle can result in a significant improvement in fuel economy.

Bluff bodies in particular are known to have high drag coefficients due to the presence of a sizeable recirculation zone in the wake thereof, and the relatively lower pressures acting as a consequence on the rear base of the trailing end. The recirculation zone is formed due to the substantially normal orientation of the base surface with respect to the flowstream, as is commonly seen in tractor-trailer arrangements. This surface orientation creates a sharp separation of the flowstream at the edge of base surface and thereby lowers the pressure on the base surface to produce the base drag. Moreover, for bluff bodies comprising multi-linked or otherwise gap-spaced unit components with gaps between adjacent units, the aerodynamic drag can be even greater when the recirculation zone formed in the gap is disrupted by a cross-flow through the gap. Cross-flow is characterized as a transversely directed flow of air within and/or through the gap due to a pressure difference in a transverse direction across the gap. Cross-flow is especially prevalent when side winds are present which can affect the flowstream characteristics around the bluff body. In such multi-unit or otherwise gap-spaced bluff bodies, an adjacent pair of unit components may be generally characterized as a leading portion and a trailing portion.

Gap cross-flow is often observed with bluff bodied vehicles having towing configurations, such as tractor-trailer arrangements (e.g. having one or more trailers), auto-trailer arrangements, and locomotives, among others. Taking the representative case of a conventional tractor-trailer arrangement, the gap between the tractor and the trailer enables pivoting of one relative to the other. FIGS. 1–4 illustrate such a tractor-trailer arrangement, generally indicated at reference character 100, having a tractor 101 as the leading portion and a single trailer 103 as the trailing portion hitched to and towed by the tractor 101. It is appreciated, however, that conventional tractor-trailer arrangements also include an additional trailer hitched to the first trailer (see for example FIG. 7). In any case, the tractor 101 has a cab portion 102 and a substantially vertical and rear-facing base surface 108. And the trailer 103 has an elongated construction with a front end 104 and a rear end 105. The front end 104 has a forward facing front surface 109 and the rear end 105 has a rear facing base surface 112, with the front surface 109 of the trailer 103 facing the base surface 108 of the tractor 101. A gap 106 is formed between the tractor 101 and the trailer 103, and in particular, between the tractor base surface 108 and the trailer front surface 109.

When placed in a flowstream, such as 107 in FIG. 1, i.e. when the tractor-trailer 100 is in forward motion, the airflow of the flowstream ideally separates off of the tractor 101 and completely reattaches downstream onto the trailer 103. As shown in FIGS. 2 and 3, however, airflow separating from the tractor 101 enters the gap 106 to form a recirculation zone defined by a vortical flow structure 110 which is similar to a vortical ring or an inverted-U shape. A stable vortical flow structure 110 (i.e. one which cannot be forced out of the gap) prevents the surrounding airflow of the flowstream from further entering the gap and thus redirects the surrounding airflow to reattach with the side of the trailer. An unsteadiness in the flow field surrounding the gap, however, can produce a pressure differential in a transverse direction across the gap which can destabilize the vortical flow structure 110 and increase aerodynamic drag. FIG. 4 shows an example of a cross-flow stream 111 completely traversing an empty gap 106 from one side of the tractor-trailer to the other side, through opposing first and second open ends 123 and 124. In this extreme case, the vortical structures would be eliminated altogether by the cross-flow stream 111. However, even small amounts of cross-flow present a compromise in the ability of the vortical structure to prevent airflow from further entering the gap, and can thereby increase the aerodynamic drag on the tractor-trailer 100.

Various methods have been introduced to address this problem of recirculation zone destabilization. One example is shown in U.S. Pat. No. 3,971,586 directed to a drag reducer for land vehicles. As shown in FIGS. 1 and 2 of the '586 patent, the drag reducer is a stabilizer plate 23, mounted on a forward panel 17 of a trailer 16 and extending into a gap 24 in attempting to stabilize vortices 28 and 29 formed in the gap. The stabilizer plate, however, only partially closes the gap, which is an imperfect situation since some air will be forced from one of the divided vortex regions to the other by pressure differences therebetween. By having such an opening through the gap a cross-flow is allowed to form, especially under side wind conditions, which can disturb the vortical structures to adversely impact aerodynamic drag.

U.S. Pat. No. 4,021,069 also shows an apparatus for reducing aerodynamic drag which is for mounting on the bluff, forward face of the trailing element of an over the road vehicle. As can be seen from FIGS. 1 and 2 of the '069 patent, the apparatus is a fairing element mounted at an upper region of the forward face, so as to provide deflection of an impinging air stream. As shown by FIG. 1 in particular, the gap between the tractor and trailer remains substantially unblocked for preventing a cross-flow therethrough.

The need for reducing the aerodynamic drag of bluff body vehicles, especially land-based vehicles traveling at, for example, highway speeds, are compelling and widely recognized. It would therefore be advantageous to provide a simple cost-effective aerodynamic drag reduction apparatus which completely spans the gap to thereby impede cross-flow through a gap between leading and trailing portions of a bluff body, such as a heavy vehicle tractor-trailer, to thereby reduce the net aerodynamic drag on the bluff body.

IV. SUMMARY OF THE INVENTION

One aspect of the present invention includes an apparatus for reducing the aerodynamic drag of a bluff-bodied vehicle in a flowstream, the bluff-bodied vehicle of a type having a leading portion and a trailing portion connected to the leading portion with a gap therebetween defining a recirculation zone, comprising: a baffle assembly adapted to span a width of the gap between the leading and trailing portions so as to impede cross-flow through the gap, and having means for automatically adjusting the span of the baffle assembly for variations in the gap width when the leading and trailing portions pivot relative to each other.

Another aspect of the present invention includes an apparatus for reducing the aerodynamic drag of a bluff body in a flowstream, the bluff body of a type having a leading portion and a trailing portion connected to the leading portion with a gap therebetween, comprising: means securable to the bluff body for bounding at least one of two transversely opposite open ends thereof when secured to the bluff body to impede airflow into the gap through said transversely opposite open ends.

And another aspect of the present invention includes an aerodynamic bluff-bodied vehicle comprising: a leading portion; a trailing portion connected to the leading portion with a gap therebetween defining a recirculation zone; and a baffle assembly spanning a width of the gap between the leading and trailing portions to impede cross-flow through the gap, and having means for automatically adjusting the span of the baffle assembly for variations in the gap width when the leading and trailing portions pivot relative to each other.

V. BRIEF DESCRIPTION OF THE DRAWINGS

The accompanying drawings, which are incorporated into and form a part of the disclosure, are as follows.

VI. DETAILED DESCRIPTION

Figure 1:
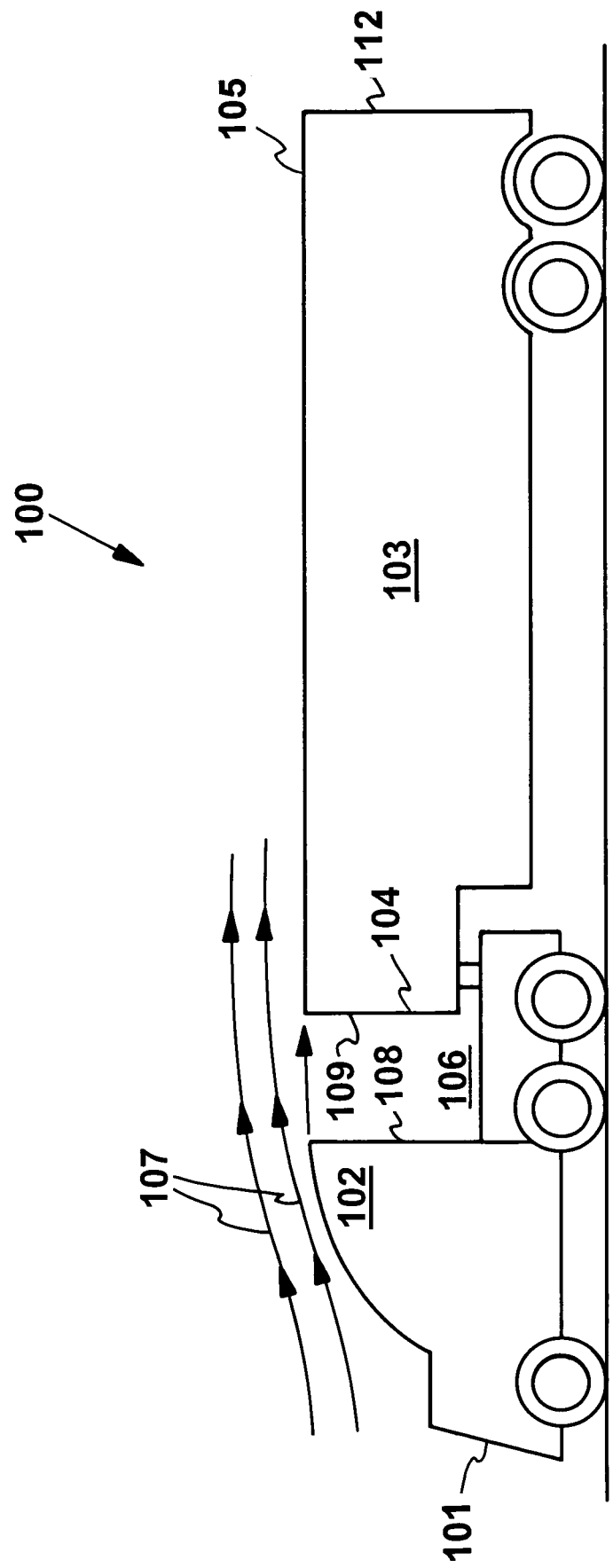
FIG. 1 is a side view of a conventional tractor-trailer type bluff body vehicle known in the prior art, and having a gap defining a recirculation zone between the tractor and the trailer when placed in a flowstream.

The present invention is directed to an aerodynamic drag reduction apparatus for use with a gap-spaced bluff body or bluff body vehicle having a leading portion and at least one trailing portion linked or otherwise connected to each other to form a gap between adjacent portions, such as for example a tractor-trailer or other multi-unit or towing vehicle arrangement. As discussed in the Background, a recirculation zone is formed in the gap which can be destabilized by a cross-flow therein or therethrough. The various embodiments of the present invention operate to maintain the stability of the recirculation zone by spanning the entire width of the gap to impede cross-flow therethrough, and thereby reduce the net aerodynamic drag on the bluff body. It is also notable that the leading and trailing portions together indicate the direction of the flowstream, i.e. the tractor or leading portion is upstream of the trailer or trailing portion.

The present invention may be utilized with different types of vehicles and vehicle combinations (e.g. towing arrangements) including automobile-trailer arrangements, trains, aircraft, or any other vehicle having a recirculation zone produced in a gap between adjacent unit portions of the bluff body. In the discussion which follows, the tractor-trailer arrangement is used as a representative bluff body configuration to illustrate the problem of gap cross-flow observed in various gap-spaced bluff bodies. As such, the reference characters used for the prior art conventional tractor-trailer arrangement shown in FIGS. 1–4 are repeated in subsequent figures, where applicable.

Figure 5:
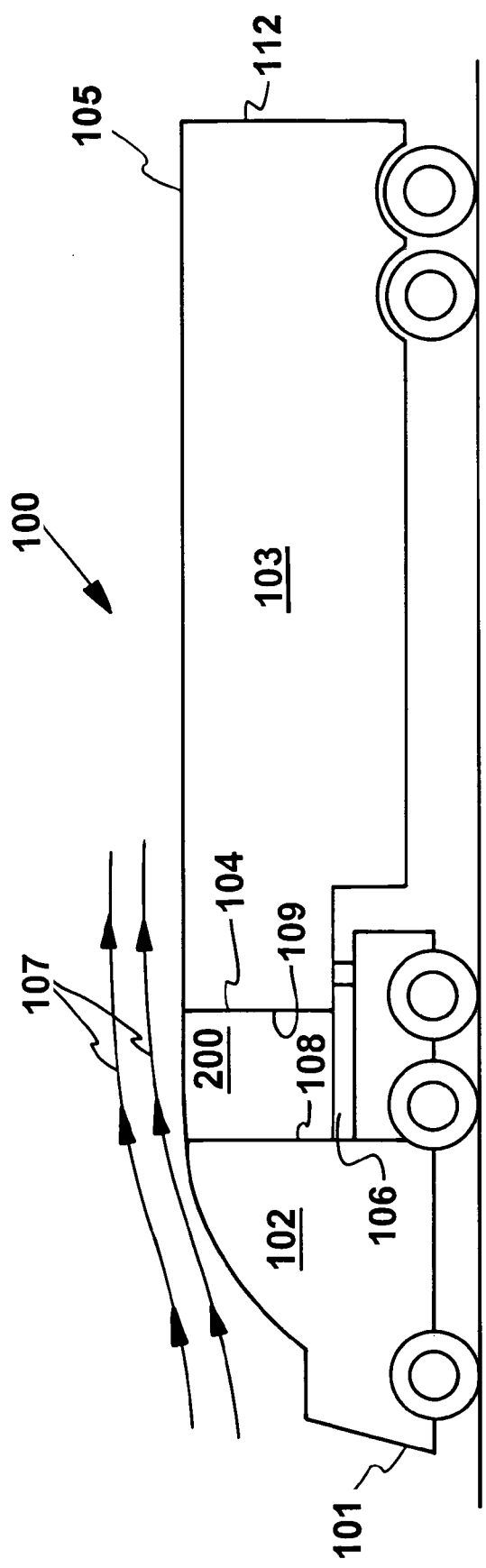
FIG. 5 is a side view of a conventional tractor-trailer arrangement having a single trailer, and using a baffle assembly (shown generically) of the present invention.
Figure 6:
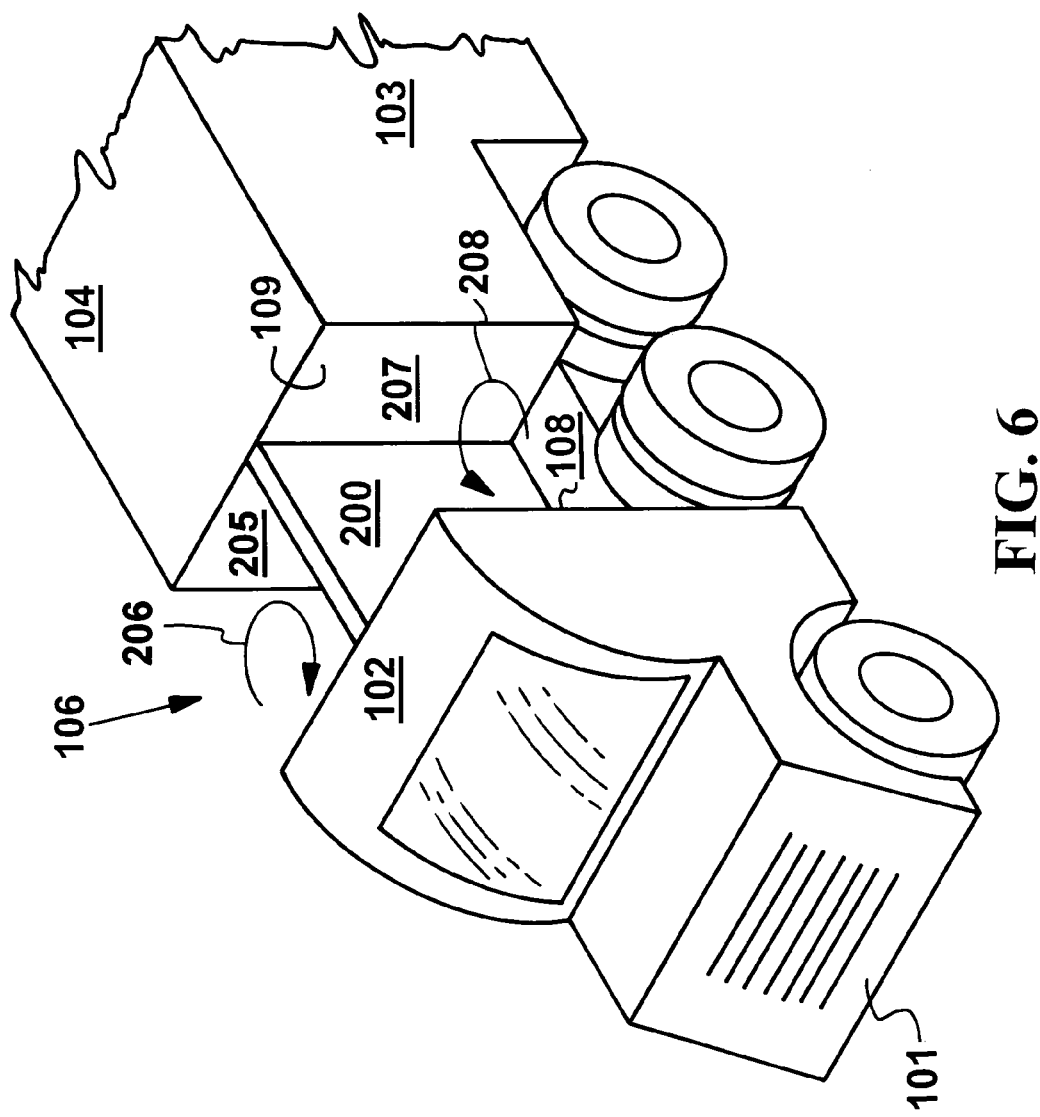
FIG. 6 is a perspective view of the baffle assembly of FIG. 5.

Turning now to the drawings, FIGS. 5 and 6 generally show the aerodynamic drag reduction apparatus of the present invention, comprising a baffle assembly 200 mounted to the conventional tractor-trailer arrangement 100 of FIGS. 1–4 in a manner which spans the width of the gap 106. In particular, the baffle assembly 200 has a thin vertical panel configuration spanning the gap 106 between the cab portion 102 of the tractor 101 and the trailer 103, and is mounted in an orthogonal direction to both the base surface 108 of the tractor 101 and the front surface 109 of the trailer 103. In this manner, the vertical panel 200 completely partitions the gap 106 into two recirculation zones 205 and 207 which support independent vortical structures 206 and 208, respectively. The two recirculation zones 205, 207 are shown substantially equal in volume, and the associated two vortical structures 206, 208 are also shown substantially equal in size and magnitude, due to the central location of the vertical panel 200 in the gap 106. It is appreciated, however, that off-center locations of the vertical panel 200 would also produce independent vortical structures substantially impervious to cross-flow therebetween.

Figure 8:
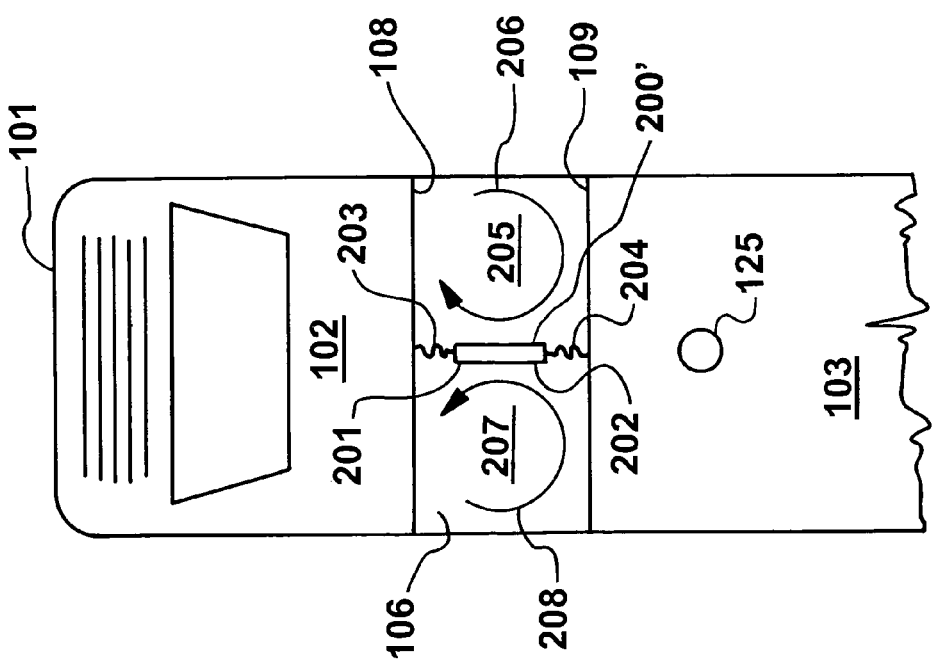
FIG. 8 is a top view of a first exemplary embodiment of the baffle assembly of the present invention comprising a single panel baffle assembly with spring mounts.

FIG. 8 shows a first preferred embodiment of the baffle assembly, indicated at 200', having a single thin vertical panel configuration. As shown in FIG. 8, a plurality of spring or otherwise resiliently-biasing suspension mounts 203 and 204 are used to connect a first end 201 of the vertical panel 200' to the base surface 108 and a second end 202 to the front surface 109. The spring suspension mounts 203, 204 enable automatic adjustment of the span of the baffle assembly to adapt to variations in gap width caused by pivoting of the tractor 101 about the pivot axis 125 relative to the trailer 103. By providing such a means for automatic span adjustment, there is no longer a need to maintain a clearance between the baffle assembly and either the base surface of the tractor or the front surface of the trailer. This ability to automatically adjust to a variable gap width permits the baffle assembly to be mounted to both the tractor 101 and the trailer 103 spanning the entire width of the gap, so as to prevent or at least substantially impede any cross-flow from passing through the gap 106. And in turn, the vortical structures formed in the recirculation zones can remain relatively stable, resulting in a net reduction in the aerodynamic drag.

It is appreciated, however, that means other than springs may be used for automatically adjusting the span of the baffle assembly to adapt to variations in the gap width. In the general case, the baffle assembly includes means for automatically adjusting the span of the baffle assembly for variations in the gap width when the leading and trailing portions pivot relative to each other. This may include the use of non-rigid, flexible panels, screens, and other flexible implementations (e.g. tarps or durable fabrics) in connection with alternative span adjustment mechanisms. To this end, FIGS. 9–12 show alternative exemplary embodiments of the gap-spanning baffle assembly of the present invention using various methods for automatically adjusting the gap span for variations in gap width.

Figure 9:
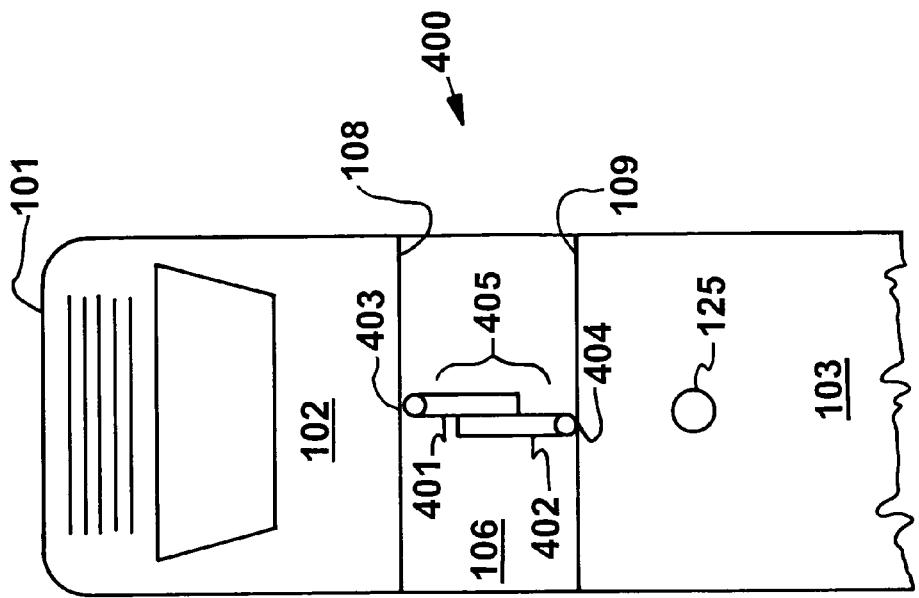
FIG. 9 is a top view of a second exemplary embodiment of the baffle assembly of the present invention comprising a two-panel baffle assembly slidably connected to each other to compensate for variations in gap spacing.

In particular, FIG. 9 shows an exemplary second baffle assembly having a multi-panel construction, such as a two-part vertical panel assembly 400. The assembly 400 has a first vertical panel 401 and a second vertical panel 402 operably connected to each other to automatically adjust the span of the assembly 400. The first vertical panel 401 is hinged at 403 to the base surface 108 of the tractor 101, and the second vertical panel 402 is hinged at 404 to the front surface 109 of the trailer 103. Each of the vertical panels has a section 405 overlapping with each other for slidably connecting the panels to each other.

Figure 10:
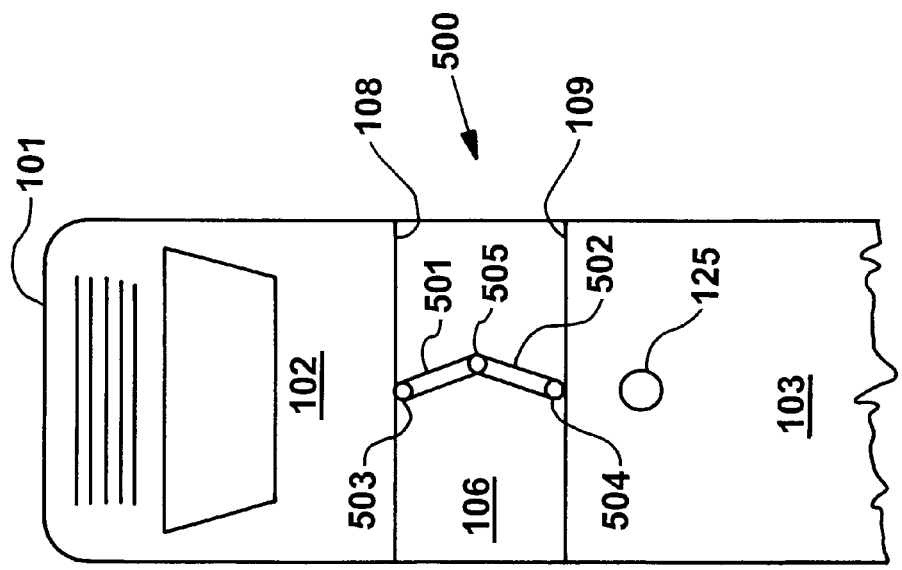
FIG. 10 is a top view of a third exemplary embodiment of the baffle assembly of the present invention comprising a two-panel baffle assembly hinged to each other to compensate for variations in gap spacing.

In FIG. 10, an exemplary third baffle assembly is shown also having a two-panel construction 500 having a first vertical panel 501 hinged at 503 to the base surface 108 of the tractor 101, and a second vertical panel 502 hinged at 504 to the front surface 109 of the trailer 103. Each of the vertical panels have a common hinging end 505 for hinging the panels to each other. In FIG. 10, the combined total width of the two vertical panels 501, 502 is shown greater than the gap width. As a matter of design, it is appreciated that the combined total width of the two vertical panels may be chosen to equal the maximum gap width for a known angular pivot range of the tractor-trailer.

Figure 11:
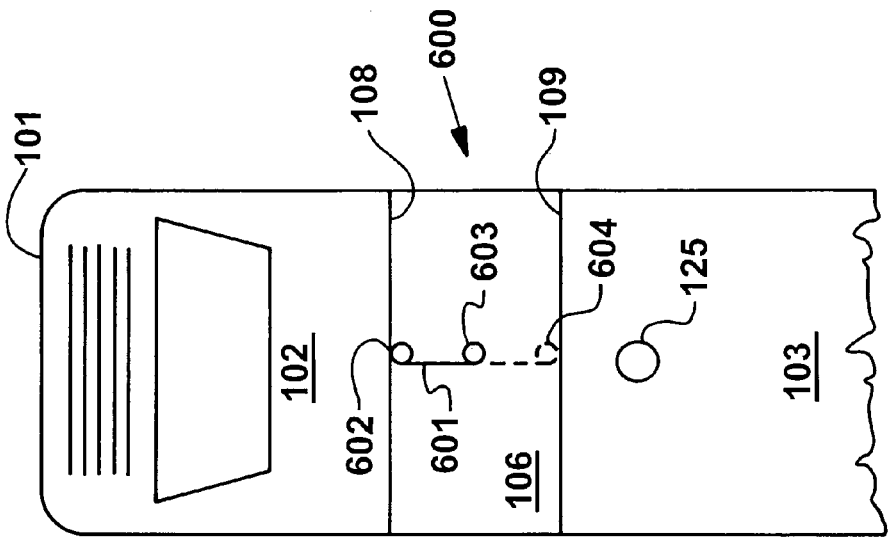
FIG. 11 is a top view of a fourth exemplary embodiment of the baffle assembly of the present invention comprising a flexible panel capable of being rolled out from a recoil axis and to compensate for variations in gap spacing.

In FIG. 11, an exemplary fourth baffle assembly is shown at 600 having a recoil mechanism 602 connected to the base surface 108 of the tractor 101 and housing a rolled-up flexible panel, tarp, or screen 601. By pulling on an end 603 of the screen 601, the screen is extended out towards the front face 109 of the trailer at a position 604 where it is subsequently connected. The recoil mechanism 602 can be locked or otherwise secured by locking means (not shown) to prevent further roll-out of the screen 601 and keep the screen taut. It is appreciated in the alternative, that the recoil mechanism can be located on the extending end 603 for housing the rolled-up screen 601, with a fixed end 602 connected to the base surface 108.

Figure 12:
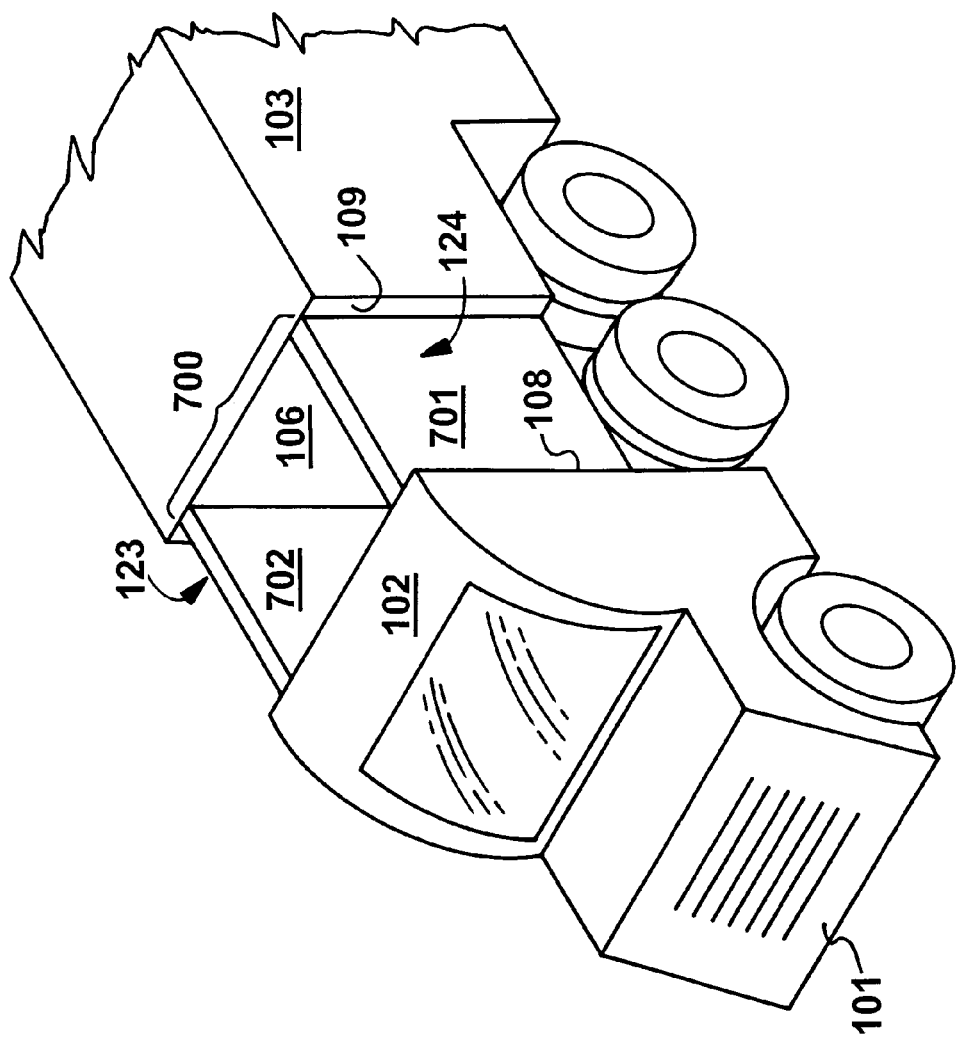
FIG. 12 is a front perspective view of a fifth exemplary embodiment of the baffle assembly of the present invention comprising two vertical panels bounding and obstructing airflow into the gap from transversely opposite open ends of the gap.

And FIG. 12 shows yet another exemplary fifth embodiment of the baffle assembly of the present invention 700, mounted to the tractor-trailer arrangement of FIGS. 1–4. The baffle assembly comprises a pair of vertical panels 701 and 702, with each panel adapted to be mounted at the transversely opposite open ends 123, 124 of the gap 106. This particular placement of the vertical panels operates to bound and substantially close off the gap 106 at the open ends 123, 124. And this arrangement operates not only to impede cross-flow through the gap, but also eliminate at least the vertical-axis vortical structures and any opportunity to destabilize said vortical structures. And while not shown in FIG. 12, each of the two panels 701 and 702 also employ means for automatically adjusting the span of the baffle assembly as previously described, to realize the benefits obtained by blocking cross-flow while enabling kinematic freedom to pivot without restriction.

Figure 2:
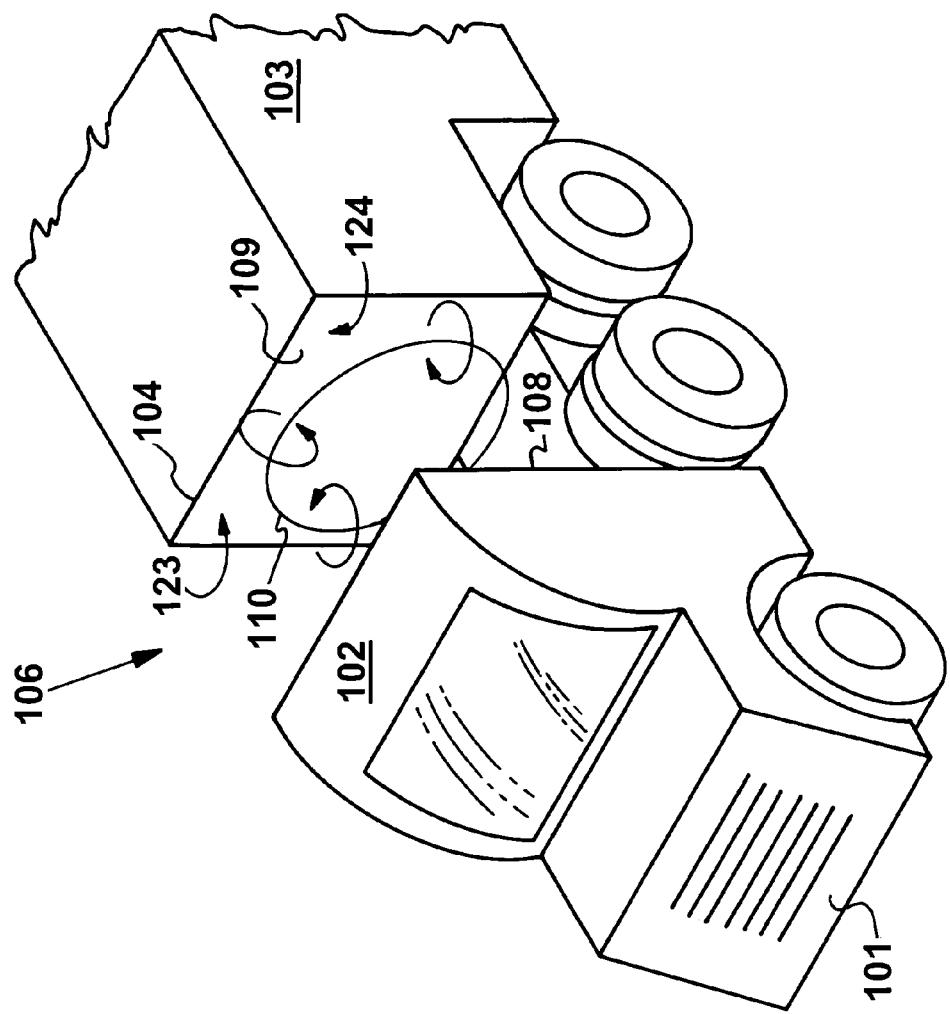
FIG. 2 is a front perspective view of the tractor trailer vehicle in FIG. 1 illustrating a stable vortical flow structure produced in the recirculation zone of the gap.
Figure 4:
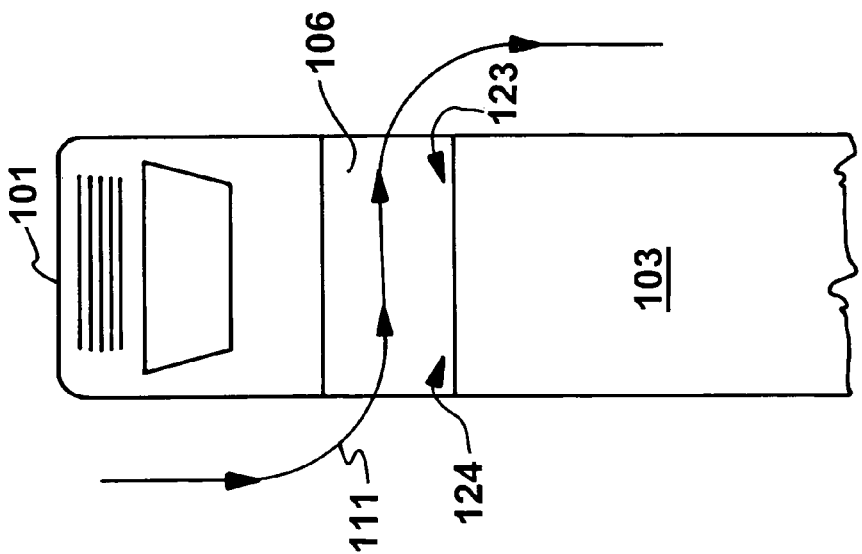
FIG. 4 is a top view of the tractor-trailer vehicle of FIG. 3 showing a cross-flow through the gap due to destabilization in the recirculation zone.
Figure 3:
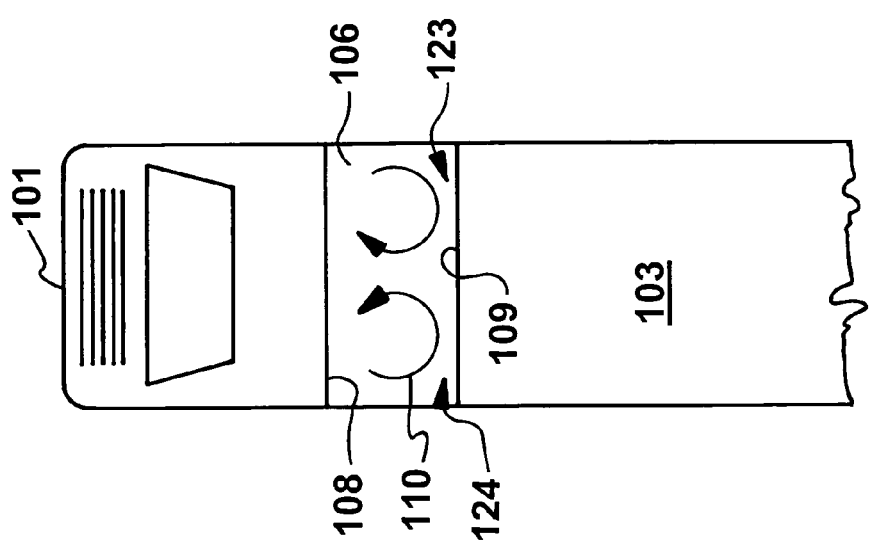
FIG. 3 is a top view of the tractor-trailer vehicle of FIG. 2 showing a stable vortical flow structure in the recirculation zone of the gap.
Figure 7:
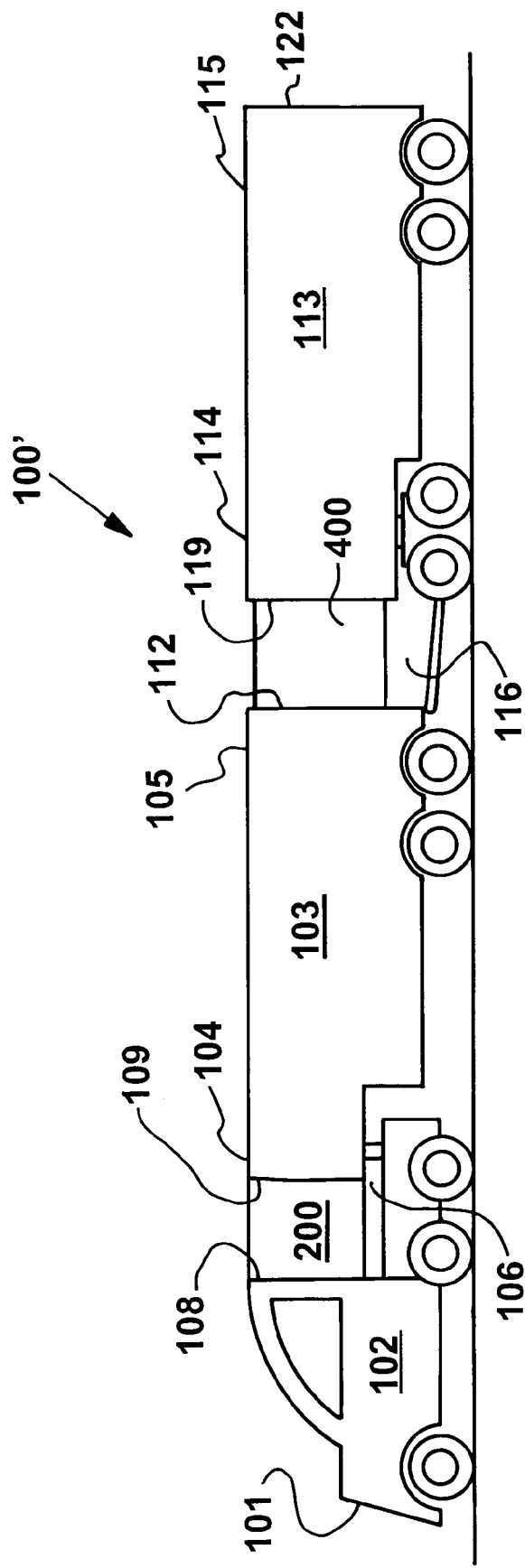
FIG. 7 is a side view of a conventional tractor-trailer arrangement having two trailers and using two of baffle assemblies (shown generically) of the present invention.

It is appreciated that the various components of the baffle assembly may be mounted and connected to each other and the tractor-trailer using suitable mounting hardware (not shown), such as for example bolts, screws, ties, clamps, suspension wire, etc. And it is also notable that when, as shown in FIG. 7, an optional second trailer is hitched behind the first trailer 103, a vortical flow structure similar to 110 shown in FIG. 2 is likely to exist in the second gap 116 between the two trailers 103 and 113. And mounting a baffle assembly, such as the vertical panel 400 (similar to baffle assembly 200 between tractor 101 and first trailer 103) in the gap 116 would likewise produce similar drag reduction benefits.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. An apparatus for reducing the aerodynamic drag of a bluff-bodied vehicle in a flowstream, the bluff-bodied vehicle of a type having a leading portion and a trailing portion connected to the leading portion with a gap therebetween defining a recirculation zone, comprising:

a baffle assembly adapted to span a width of the gap between the leading and trailing portions so as to impede cross-flow through the gap, the baffle assembly comprising a first vertical panel adapted to be mounted to the leading portion and a second vertical panel adapted to be mounted to the trailing portion, so that said first and second vertical panels are parallel to each other with overlapping planar sections capable of sliding in parallel relative to each other for automatically adjusting the span of the baffle assembly for variations in the gap width when the leading and trailing portions pivot relative to each other.

2. The apparatus of claim 1,
wherein the first vertical panel is adapted to be mounted to a base surface of the leading portion, and the second vertical panel is adapted to be mounted to a front surface of the trailing portion facing the base surface.

3. The apparatus of claim 2,
wherein the first and second vertical panels are adapted to be hinged to the base surface and front surface, respectively.

4. An aerodynamic bluff-bodied vehicle comprising:
a leading portion;
a trailing portion connected to the leading portion with a gap therebetween defining a recirculation zone; and
a baffle assembly spanning a width of the gap between the leading and trailing portions to impede cross-flow through the gap, the baffle assembly comprising a first vertical panel mounted to the leading portion and a second vertical panel mounted to the trailing portion, said first and second vertical panels are parallel to each other with overlapping planar sections capable of sliding in parallel relative to each other for automatically adjusting the span of the baffle assembly for variations in the gap width when the leading and trailing portions pivot relative to each other.

5. The aerodynamic bluff-bodied vehicle of claim 4,
wherein the first vertical panel is mounted to a base surface of the leading portion, and the second vertical panel is mounted to a front surface of the trailing portion facing the base surface.

6. The aerodynamic bluff-bodied vehicle of claim 5,
wherein the first and second vertical panels are hinged to the base surface and front surface, respectively.

7. The aerodynamic bluff-bodied vehicle of claim 4,
wherein the aerodynamic bluff bodied vehicle has a tractor-trailer arrangement with a tractor as the leading portion and a first trailer as the trailing portion.

* * * * *